United States Patent [19]

Lipoma

[11] 3,718,082
[45] Feb. 27, 1973

[54] APPARATUS FOR CONTINUOUS ELECTROMAGNETIC STERILIZATION

[76] Inventor: Samuel P. Lipoma, 825-19th Place, Delano, Calif. 93215

[22] Filed: April 20, 1971

[21] Appl. No.: 135,629

[52] U.S. Cl. ..................... 99/470, 99/355, 99/362, 219/10.55
[51] Int. Cl. ............................................. A23l 3/04
[58] Field of Search ..................... 99/249, 251–252, 99/253, 355, 362, 359, 360–362, 222, 233, 274; 219/10.55

[56] References Cited

UNITED STATES PATENTS

| 2,685,833 | 8/1954 | Hagopian | 99/253 |
| 3,092,503 | 6/1963 | Gray | 99/249 X |
| 3,321,314 | 5/1967 | Jeppson | 99/386 UX |

Primary Examiner—Robert W. Jenkins
Assistant Examiner—Arthur O. Henderson
Attorney—Owen, Wickersham & Erickson

[57] ABSTRACT

Method and apparatus for sterilizing food in a continuous process with the aid of electromagnetic energy. A conveyor conducts food into and out from a pressure vessel that encloses and pressurizes an electromagnetic sterilizing tunnel and a cooling means, through both of which the conveyor conducts the food. The pressure vessel has pressure retaining means at the loci where the conveyor enters and leaves the tank. The food may be either in or out of containers; if in containers, the containers may be either open or closed and sealed, so long as the containers are of a type transparent to the electromagnetic energy being used. If the containers are not closed, a container sealing device is interposed between the sterilizing tunnel and the following cooling means. If the food has not been put in containers at all when it enters the pressure vessel, it is packaged inside the pressure vessel. Having the sterilizing and cooling done under pressure enables the use of high temperature sterilization and enables prevention of overcooking as well as preservation of the basic texture and shape of the food being treated. Superheated steam may be used in the sterilization step.

11 Claims, 6 Drawing Figures

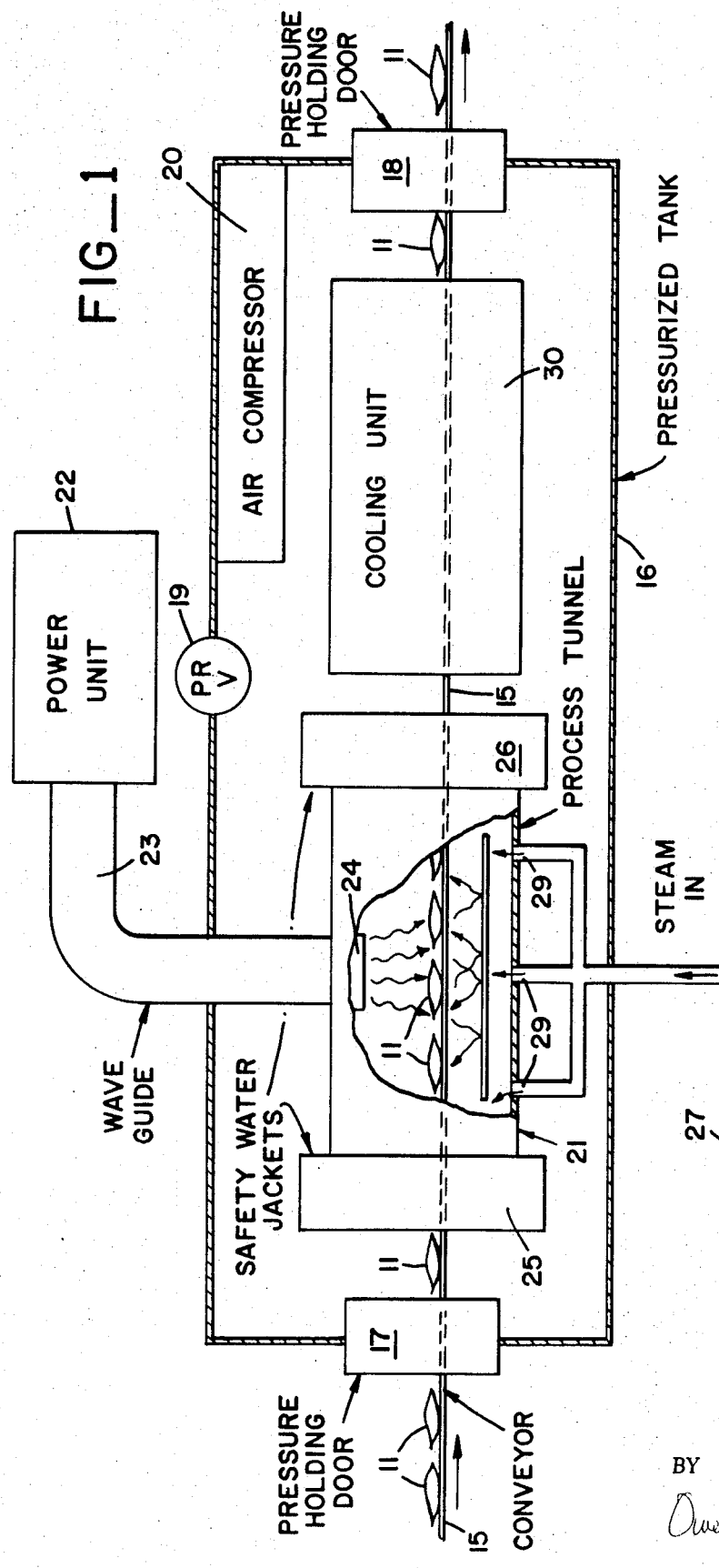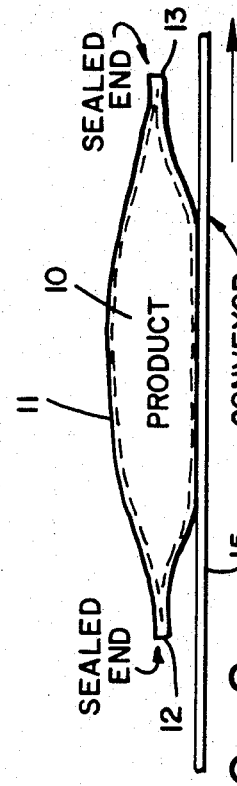
INVENTOR.
SAMUEL P. LIPOMA

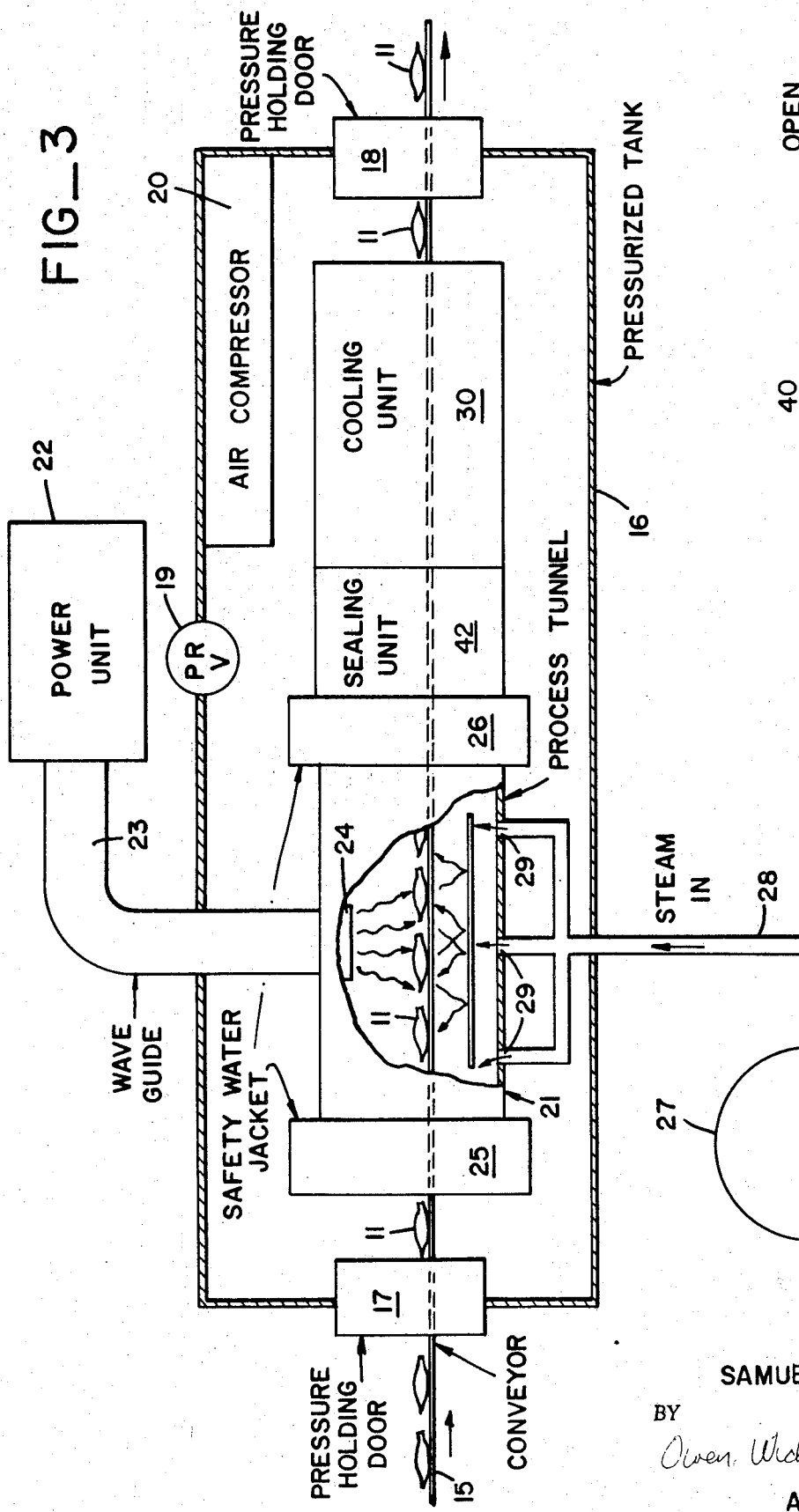
FIG_3
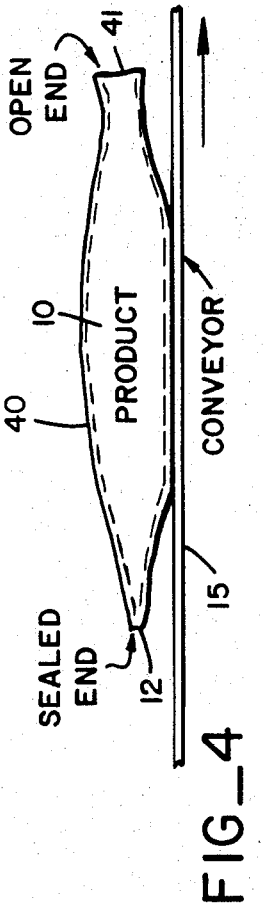
FIG_4
INVENTOR.
SAMUEL P. LIPOMA
BY
Owen, Wickersham & Erickson
ATTORNEYS

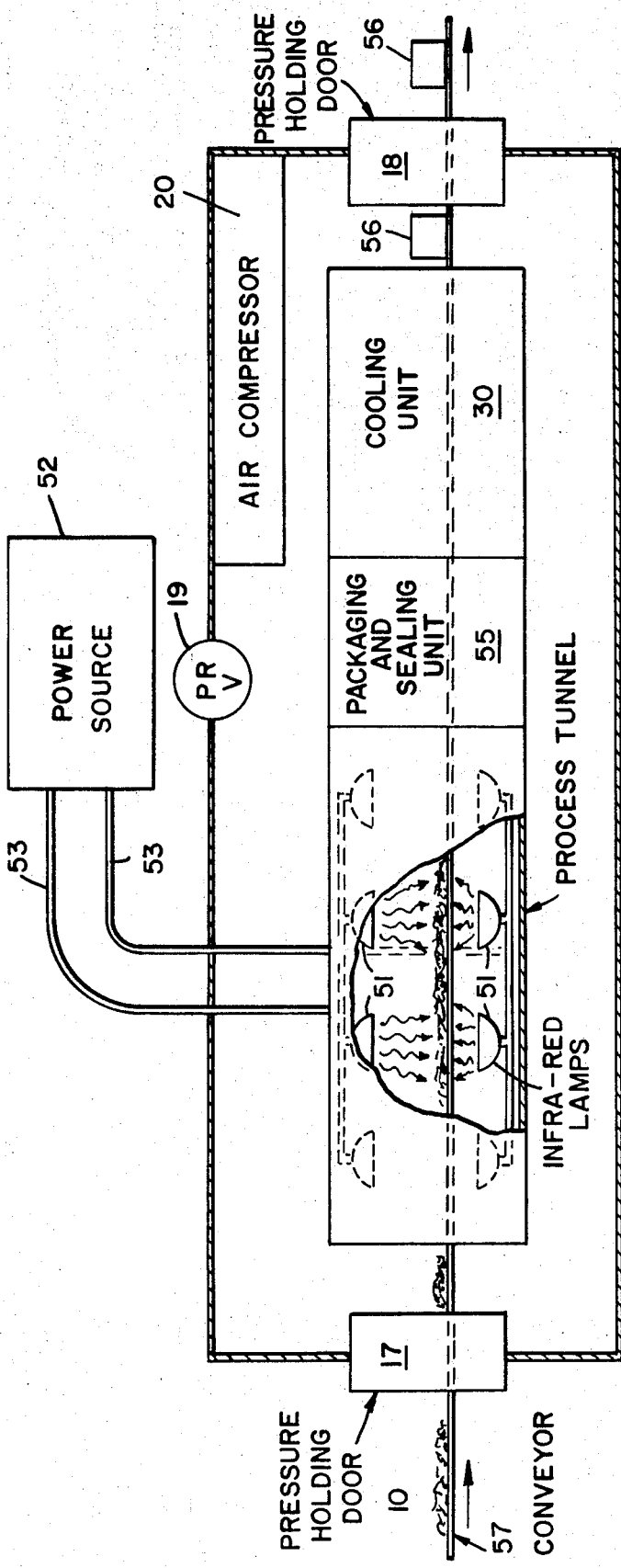
FIG_5
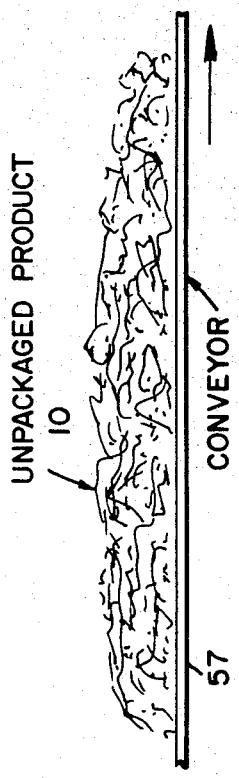
FIG_6
INVENTOR.
SAMUEL P. LIPOMA

APPARATUS FOR CONTINUOUS ELECTROMAGNETIC STERILIZATION

BACKGROUND OF THE INVENTION

This invention relates to an apparatus for sterilizing food by electromagnetic energy in a continuous process.

In this invention the food may be processed while in packages which are transparent to the electromagnetic energy that is used during the sterilization, and the packages may be either sealed or unsealed at the time of sterilization. Alternately, the sterilization may be practiced before the food is placed in a package.

Most packaged food has heretofore been sterilized at or only slightly above the boiling point of water and as a result has been overcooked, because the amount of heating necessary to achieve sterilization at 100° C. is far more than the amount of heating needed to cook the food properly at that temperature. The present invention enables the food to be sent to the consumer completely cooked, if desired, or only partly cooked, if desired, but definitely not overcooked, while at the same time the food is completely sterilized.

The invention employs high-temperature sterilization, a treatment which has been proposed before. Sterilization of food is especially effective at high temperatures, and the cooking effect does not increase as rapidly as the sterilizing effect with an increase in temperature. Thus, in many instances sterilization is increased in powers of 10 per each 10° C. increment in temperature, while the cooking effect is increased only in powers of two for the same increment. Thus at 130° C. (or 268° F.) the sterilization effect per unit time is a thousand times as great as at 100° C., while the cooking effect is only eight times as great. By cutting the time to one one-hundredth what was used at 100° C. to achieve sterilization, there would be ten times the sterilization effect but only one-twelfth as much cooking.

High temperature sterilization has heretofore been available mainly for liquids. The present invention makes it possible to apply high temperature sterilization to solid foods, such as vegetables, meats, and so on, even if they are not in soups or in stews, as well as those that may be in soups or stews. Liquids can also be treated by this process, if desired.

The invention employs electromagnetic energy, such as microwave energy or infra-red energy to sterilize the food. Here, again, there are prior uses of electromagnetic energy in the cooking and sterilization of foods, but prior systems have been confronted with problems heretofore unsolved. Some such systems have been limited to batch production, where one batch of food was placed in a microwave oven, treated for a desired time and then taken out. While batch production may be satisfactory for some uses, it is not satisfactory for very large production, and it is inefficient because considerable energy has to be dissipated before it is safe to open the oven. Therefore there is a considerable waste of energy.

On the other hand some continuous processes are practical only with foods that are to be served at once and are to be packaged in sealed containers. Continuous processes employing electromagnetic radiation for high temperature sterilization of packaged foods or foods that are to be sterilely packed have not worked out so well. A principal reason for this has been that unless the food is kept under pressure, either the sterilization has taken place at approximately the boiling point of water or only slightly above that, or else there has been a critical change in the consistency and texture of the food. Many vegetables either explode or shatter when they are heated very rapidly at atmospheric pressure by electromagnetic energy to a temperature much higher than the boiling point, because the water inside the food is boiling deep within it and the steam is seeking an outlet. This phenomenon has made it substantially impossible to obtain sterilization at high temperatures, such as 280° F., unless the food can be kept under pressure.

It is relatively easy to keep food under pressure in a metal tank or autoclave but microwave ovens cannot be used in connection with metals for then they will heat the metal rather than heating the food. For this reason food also cannot be treated by microwave ovens if it is in metal cans. On the other hand, if the food is in a package which is transparent to the microwave energy, such as a package made of glass or of suitable plastics, the food can be heated without directly heating the package. However, with such packages, if the food is heated to a high temperature inside the package and if the package itself is not kept under pressure, the package tends to explode or to rupture.

Attempts have been made to achieve sterilization by microwave ovens with the food partly or completely packaged before treatment by pressurizing the outside of the package, but these attempts have resulted in difficulties one way or another. In some such processes, the apparatus has been unduly complex and expensive, sometimes involving conducting the packages through oil or water into and out from a pressure zone. In other such processes, the pressure chamber itself has been made of material transparent to the energy being used; while the idea has some attractiveness, so far it has not proved out, because no such material has been able to endure the electromagnetic energy for a long enough period of time. For example, a chamber made out of an otherwise suitable plastic may have a life of only 1 or 2 hours, up to perhaps 5 or 6 hours, after which the tube of such plastic, through which the food packages were conducted during sterilization, cracked or gave way or even disintegrated. The life has been extended to about 16 hours by making the chambers from 5 ⅛ inch spun glass fibers treated with plastic, but a 16 hour life is still far from satisfactory.

A further disadvantage of the processes heretofore in use is that many were incapable of utilizing dry steam, although electromagnetic energy processes are aided in sterilization by the injection of high pressure steam. Such steam has made it even more difficult to provide suitable pressure vessels.

SUMMARY OF THE INVENTION

The invention solves these difficult problems by reversing the ordinary concept of microwave energy packaging and sterilizing. It does this by placing all of the processes within a pressure vessel, instead of placing the pressure vessel within one or more steps of the process.

Thus, in this invention an electromagnetic sterilizing tunnel and a cooling device which follows the tunnel are all placed inside a pressure vessel, and a conveyor conveys the food into and out from the pressure vessel through suitable pressure openings and also conveys through the tunnel and cooling device, with the entire process being conducted inside the pressure vessel.

If the food itself is in glass or suitable plastic containers that are transparent to the microwave energy or to the other electromagnetic energy being used, the food may be packaged in these containers and either sealed or not sealed, then conducted into the pressure vessel and, while within the pressure vessel, into a suitable electromagnetic treatment oven which may be a microwave tunnel or may be an infra-red device. If the food has been sealed in the containers, it then goes directly from this oven to a cooling unit where its temperature is brought down at least below the boiling point of water before the food is conducted outside the pressure vessel. If the food has not been sealed prior to its introduction into the pressure vessel, there is a sealing or closing unit within the pressure vessel, preferably in between the oven and the cooling unit. If the food has not been packaged before introduction to the pressure vessel, then there is also a packaging unit within the pressure vessel which packages the food after it has been sterilized.

If microwave energy is used as the power, the microwave energy may be generated either outside the pressure vessel or inside it, so long as it is conducted to the microwave oven by suitable wave guides. If infra-red energy is used, the infra-red lamps may be heated by either gas or electricity at the locus of the unit.

Steam is preferably introduced into the sterilizing unit where the electromagnetic energy is used, and the pressure is such that superheated steam may be used. In fact, it is important for the pressure vessel (and the oven and cooling unit within it) to be pressurized to a pressure depending on the temperature used, so that the boiling point of water will not be exceeded at that pressure. The preferred pressure will be between 10 and 50 p.s.i.g., in order to utilize high temperature sterilization without damage to the food particles.

The maintenance of high pressure inside the pressure vessel enables the attainment of temperatures much higher than 100° C., high enough to achieve rapid high heat sterilization but without breaking up the food particles or elements and without destroying the containers. Thus, potatoes, peas, carrots, meats, and so on, can be cooked either inside or outside a package at temperatures of about 260° to 300° F., e.g., sufficient to sterilize them while giving them only a rather rudimentary cooking, so that when the container is later opened in the kitchen by a housewife or by a chef of a restaurant, the food has not, for practical purposes, really been cooked yet, it has been only precooked a small amount; therefore, it will taste much more like completely fresh food brought into the kitchen than like processed or canned food.

At the same time, these advantages are obtained in a continuous process and with great efficiency, so that it is unlike those prior art processes where efficiences have been low for high temperature sterilization or where high temperature sterilization has simply not been possible.

BRIEF DESCRIPTION OF THE DRAWINGS

Other objects and advantages of the invention will appear from the following description of some preferred embodiments.

In the drawings:

FIG. 1 is a somewhat diagrammatic view in side elevation and in section of an apparatus and process embodying the principles of the invention.

FIG. 2 is an enlarged view of the food container of FIG. 1 as it enters the process.

FIG. 3 is a view similar to FIG. 1 showing a modified form of the invention, in which there is a sealing unit inside the pressure vessel.

FIG. 4 is a view similar to FIG. 2 of the container of FIG. 3 before it enters the process.

FIG. 5 is a view similar to FIGS. 1 and 3 of another modified form of the invention in which a different type of electromagnetic energy is used and in which the food is introduced unpackaged and the unit contains a packaging and sealing unit.

FIG. 6 is a view similar to FIGS. 2 and 4 of the product as it enters the process of FIG. 5.

DESCRIPTION OF SOME PREFERRED EMBODIMENTS

Practice of the Invention with the Food Pre-Packaged in a Sealed Container, FIGS. 1 and 2

The embodiment of FIGS. 1 and 2 relates to the processing of a product which has already been packaged, the container having been sealed before the product is sterilized.

In this instance, a food product 10 is inside a container 11 shown in FIGS. 1 and 2, and the container 11 is sealed. By way of example, the container 11 may be a bag or pouch having sealed ends 12 and 13 carried by a conveyor 15. The bag or pouch 11 may be made from a suitable plastic material which is transparent to the electromagnetic energy being used and is able to withstand the packaging conditions. For example, the plastic may be polyethylene or nylon or some other type of synthetic material that does not reflect electromagnetic energy. In place of the bag or pouch 11 a glass container could be used.

It is important in this instance for the container 11 not to be metal and not to be sealed by metal, because this particular embodiment of the invention utilizes a microwave oven; so there should be no metal in the product 10 or its package 11. The conveyor 15 should also be free from any metal. Again, the plastics mentioned could be used for the conveyor, and so can glass fiber belts bonded by suitable plastics or without the plastics, but in all instances made without the use of any metal. The conveyor 15 is preferably continuous, but for the purposes of this example, the return flight is not shown. It may be either inside or outside the pressure vessel.

As stated before, the invention relates to a continuous process, and the conveyor 15 is used in a continuous system to carry the product 10 through the entire process. As also stated earlier in broad terms, the entire process is carried on within a pressure vessel. By way of example, a pressurized tank 16 is shown in FIG. 1 having a pressure holding entry door 17 through which the conveyor 15 enters the tank 16 and a pressure holding exit door 18 through which the conveyor 15 leaves the pressurized tank 16. Various types of pressure holding valve gates are known, and the invention does not relate to which type is used; moreover, since they are well known, they are not shown in detail. In place of rotating valve gates or alternating closure gates and so on, it is possible to have the conveyor 15 enter and leave through a column of water, or through any other device for maintaining the pressure within the pressurized tank 16.

The pressurized tank 16 may be a steel tank and it may be rectangular or circular or elliptical or any other desired shape. The tank 16 may comprise two tanks, one for the sterilizing and one for the cooling, joined together by suitable pressure maintaining means. By way of example and to illustrate the principle, a single pressurized tank 16 is shown as probably the preferable way of achieving the desired result. In any event, it is desirable for the pressurized tank 16 to have a pressure relief valve 19 at some point to relieve the pressure should it become greater than that intended. An air compressor 20 may be incorporated inside the pressurized tank 16 or immediately adjacent to it, with its outlet connected to the tank 16 and suitably sealed.

In any event, the invention calls for carrying out the process entirely within the pressurized tank 16 and for the pressurized tank 16 to have means for supplying pressure to it and means for relieving the pressure beyond a desired pre-selected value. Preferably, the compressor 20 is operated automatically to maintain the desired pressure, and the pressure relief valve 19 is simply a safety feature, placed in any location suitable for achieving the desired result. The chamber or chambers may be made of any material of sufficient strength to hold the pressure and may be of any shape desired.

Within the pressurized tank 16 of FIG. 1 is an electromagnetic oven 21. The oven 21 may be supplied by power from a power unit 22, which may be inside or outside the tank 16, but generally will be outside and will be connected to the oven by a wave guide 23. Here again, the invention does not rely on any particular microwave oven. There are ovens presently available which are quite operable in the invention. These, of course, are the continuous type of ovens through which a conveyor extends or can extend. Unless the entire power unit 22 is in the pressure chamber 16, the end of the wave guide 23 where the energy enters the process tunnel 21 must be covered with a window 24 of glass or material that is transparent to the electromagnetic energy, so that the interior of the tank 20 can be kept under constant pressure. That is, there should be no pressure backing out through the wave guide 23. Of course, if the power unit 22 is inside the tunnel, this window 24 is not needed.

Typically, the microwave energy, which enters at several locations, is reflected from the opposite wall of the tunnel 21 and goes through the conveyor 15 and the food 10 and container 11 thereon, the food 10 absorbing the energy as it passes through it. The energy makes several passes through the food 10 in the course of reflection, and the energy absorbed is quite sufficient to heat the product to a desired sterilizing temperature. At opposite ends of the oven tunnel 21, energy trapping devices 25 and 26 are provided to retain the excess microwaves within the oven 21 and to protect people outside the oven 21 from this energy. Typically, at least 3 feet on each end of the tunnel 21 are provided with water safety jackets 25 and 26 to absorb any energy not coupled to the product 10 being conveyed through the process tunnel 21.

The microwave oven 21 may, of course, have any desired frequency that is approved for commercial use. For example, it may be rated at 915 megacycles or at 2,450 megacycles and so on. The actual frequency is not important to the present invention so long as a satisfactory frequency is used that couples to the water in the food 10.

No attempt is made to seal the entry way when the conveyor 15 passes into the oven 21 or where it leaves the oven, because it is desired to keep the interior of the oven 21 at a uniform pressure, which is the same throughout the interior of the tank 21. The main reason for having the pressure is to subject the container 11 to pressure while it is inside the tunnel 21. This makes it possible to employ heat at a suitable temperature for high temperature sterilization. The temperature may be limited by the type of package 11 that is used. Until rather recently, it seemed to be difficult to find a plastic film that would withstand temperatures in excess of 260° F. However, packages lately have been developed that will withstand temperatures of 280° F., and at 280° F. the bacteria are destroyed very quickly so that the time is no longer a principal factor. As a result, the food 10 remains in a more natural state without shrinkage and remains sterilized without refrigeration for an indefinite time afterwards — many years at least. In order to use these high temperatures, it is important to have the high pressure acting on the container 11, so long as the food 10 or container 11 are above 100° C. Only when the package has been cooled is it safe to relieve the pressure on it. Before that time, the container 11 and even the product 10 in it tend to explode or break up, if they are above 100° C. and the pressure is atmospheric.

Many advantages can be obtained by using steam during the time that the product 10 is in the oven 21. Live steam and especially superheated or dry steam has a tendency to distribute the microwave energy better throughout the process tunnel 21. Therefore a boiler 27 may be provided, either outside the pressurized tank 16 or in it, as desired. In FIG. 1, the boiler 27 is shown outside the tank 16, and a steam conduit 28 leads into the tank 16 through a suitably sealed opening, and the steam is distributed at outlets 29 into the microwave oven 21.

Since the food 10 itself contains moisture, the microwave energy is instantaneously coupled to the food material 10 in the container 11 while they are in the process tunnel 21. Temperatures at much higher than 212° F. can be generated in the material 10 inside the container 11 without the material giving off steam, since everything is held under high pressure below the boiling point of water at that pressure. Typical pressures are in a range of 10 to 50 p.s.i.g. For example, the chamber inside the tank 21 may be pressurized to a 20 p.s.i. gauge pressure, and the product 10 may then be heated in the oven to 260° to 280° F. without giving off steam. As a result, the food material 10 remains almost the same in appearance and shape as when it is introduced into the tunnel 21. The sterilizing time may vary from about 1 second to 35 minutes, depending on the desired conditions.

The conveyor 15 passes through the microwave tunnel 21 at such a rate of speed and over such a length of path that the desired sterilization at the desired pressure and temperature is achieved. When the conveyor 15 leaves the process tunnel 21 through the safety water jacket 26, it then goes on to a cooling unit 30. In FIGS. 1, 3 and 5, the cooling unit 30 is shown in the same tank 16, as the sterilizer and, in effect, it will always be in the same pressure vessel, although in actual construction the tank 16 may resemble two tanks connected together by a small conduit or may have any other structure that will get the desirable result.

Within the cooling unit 30, the food 10 and the container 11 are cooled below the boiling point of water so that the container 11 will not burst. In the cooling unit 30 any desired cooling means may be used. For example, a salt brine solution of liquid below the freezing point of water may be in the cooling unit 30, and the food containers 11 immersed in that and then rapidly cooled. The containers 11 may be cooled by a refrigerating unit operated by freon or ammonia or sulfur dioxide. In any event, rather rapid cooling is important because when the product 10 leaves the electromagnetic process tunnel 21, the temperatures are relatively high, and the product 10 tends to continue to cook until it is positively cooled. Liquid dissipates the heat better than mechanical devices or gases and is generally preferred. While the product 10 may be cooled to any temperature below the boiling point of water, it preferably is cooled considerably lower, say down to about room temperature before it leaves the pressurized tank 16 through the lock 18. Therefore, so long as the container 11 is actually sealed it does not require refrigeration to keep the food 10 fresh and sterile.

The Process with the Product in Containers but the Containers Not Sealed, FIGS. 3 and 4

FIGS. 3 and 4 show a modified form of the invention generally like that already described in FIG. 1. The principal difference is that an unsealed container 40 is used, having at the time it enters the pressurized tank 16 an open end 41. Under these conditions, in order to practice the process adequately, a sealing unit 42 is provided inside the pressurized tank 16. The sealing unit 42 may be located between the process tunnel 21 and the cooling unit 30. With certain types of cooling units it could be located beyond the cooling unit 30. That, of course, would be a type of cooling unit that did not introduce anything into the container 40, and could not be a brine cooling unit. Thus a refrigerated tunnel which introduces nothing, could be followed by the sealing unit 42. However, it is generally preferable to do the sealing before cooling. The sealing unit 42 may be of any kind that is adapted for use with the kind of container 40 that is being used. By way of example, the remainder of the apparatus is shown as exactly the same as the embodiment of FIGS. 1 and 2, although there could be differences.

An Infra-Red Unit for Unpackaged Product, FIGS. 5 and 6

The embodiment shown in FIGS. 5 and 6 has some important similarities and some important differences with respect to the units of FIGS. 1 through 4. The pressurized tank 16 is again present. A process tunnel is inside the tank 16, but here it is a modified form of process tunnel 50, which in this instance uses infra-red power. The gas or electricity used to provide the infra-red may be connected inside the pressure tank 16 to lamps 51 inside the process tunnel 50. Safety water jackets are not necessary, and the use of steam is not shown in this embodiment, although it could be used if desired, as in FIGS. 1 and 3.

Infra-red energy may be supplied from either gas or electricity to heat the infra-red lamps 51, though more economical results and generally better results are achieved with gas. The process tunnel 50 contains all of the needed components, and there is no need for a separate power unit or for any wave guides. The gas or electricity may be conveyed into the process tunnel 50 and used to heat the lamps 51 right in the process tunnel 50, which is of course again within the pressure chamber of the tank 16. The need for a steam atmosphere is not as great as when using the infra-red type of electromagnetic energy as when using microwave energy, so that it is shown omitted. However, introduction of steam could still take place, if it is desired to use steam in the process. In that case, the installation would, in that respect, resemble those shown in FIGS. 1 through 4.

This embodiment may be used with packaged foods, as long as the containers let the infra-red act satisfactorily on the product 10 inside. By way of example, however, FIGS. 5 and 6 show a product 10 which has not been packaged before the conveyor 15 carries it into the pressurized tank 16. It should also be mentioned that an unpackaged product 10 can be treated in the processes of FIGS. 1 through 4, so long as certain things are added which are present in FIG. 5.

Thus, the unpackaged product 10 enters on the conveyor 15 through the pressure holding door 17 and goes into the process tunnel 50, where it is treated in this instance with infra-red energy, although it could have been treated in a process tunnel 21 like that shown previously. After the food leaves the process tunnel 50, it may be introduced to a packaging or sealing unit 55 where it is placed inside a container 56 and the container 56 sealed. From the unit 55 it goes to a cooling unit 30. Alternatively, the product 10 could be cooled first and then packaged, so long as both the cooling unit 30 and the packaging unit 55 are, together with the process tunnel 50, all in the pressurized tank 16. The important thing is that the product 10 here can be sterilized and later packaged, all within the tank 16, as well as being cooled within the tank 16, whatever order there is between the packaging and the cooling steps. The container 56 may be a pouch or bag like that shown, or it may be a glass container or other suitable container. The sterilized, packaged, cooled food 10 then leaves the tank 16 on the conveyor 15 through the pressure holding door 18, after having been packaged, sealed and cooled while still under pressure in the pressurized tank 16.

Of course, the atmosphere where the product 10 is packaged must be sterile, and the containers themselves must be sterile, so that this is a type of asceptic canning. This is carried out in the well-known manner of carrying out such processes. The main difference in the FIG. 5 process, thus, is the incorporation of the packaging and sealing unit 55, and not directly connected therewith but another completely separate difference is the using of infra-red energy.

Examples of the Invention, Preliminary Remarks

At atmospheric pressure, bacteria in potatoes can be killed only after heating at 212° F. for 20 minutes. A conventional autoclave using steam or hot water may still require about 20 minutes, even in a pressurized chamber, because time is needed there to transfer the heat from the outside of the product through the center or core of the product. However, in a microwave or infra-red device of this invention, the high temperatures may be achieved throughout the product all at the same time rather than from the outside in. By eliminating the long time that it takes for the heat to pass from the outside in, in order to sterilize the material, the cooking time can be substantially reduced. By raising the pressure from zero gauge to 27 p.s.i.g. and achieving a temperature of 270° F., the thermal death time of the bacteria is reduced to a matter of seconds.

EXAMPLE I

Potatoes, meats, caggage, and carrots may be treated according to the principles of the invention in sealed plastic containers within a chamber pressurized to 45 p.s.i.g., by a microwave machine using a 915 megacycle frequency. Within 2 minutes the product is heated to 290° F. The container is then subjected to cold water under pressure and the container cooled as rapidly as possible. Each of the foods is found completely sterile, and since it had been treated under pressure according to this invention, the food had not emitted any steam and looked more like fresh food than canned food does. The product has been found to remain sterile and usable at room temperature without refrigeration.

EXAMPLE II

Six ounces of peeled cubed potatoes in a closed laminated polyethylene pouch are moved into an air tight chamber which is pressurized to 20 p.s.i. gauge. The potatoes are then subjected to four kilowatts of microwave energy for 4 minutes. A thermometer indicates a temperature of about 260° F. Cold water is used to cool the pouch and product, while the product is still under pressure, to a temperature below 212° F. Upon opening a pouch, later it is found that the potatoes are sterile.

EXAMPLE III

Three ounces of broccoli are placed in a polyethylene pouch and sealed. The pouch is moved into an air tight vessel pressurized at 30 p.s.i.g. The food is subjected to 5 killowatts of microwave energy for 1 minute, and the temperature of the product is found to reach about 268° F. After this 1-minute treatment, the pouch is cooled by cold water while under pressure and the product cooled below 212° F. The product is later studied and found to be sterile, free of all bacteria.

EXAMPLE IV

Three ounces of ground beef are placed in a laminated polyethylene pouch, and the pouch is sealed and moved into an air-tight chamber pressurized at 35 p.s.i.g. The container and the beef in it are subjected to 5 killowatts microwave power in a microwave oven for 50 seconds. A thermometer in the package will indicate an internal temperature in the food of about 280° F. After the pouch has been cooled with cold water under pressure to below 212° F. the package is removed to the air. Later studies show that the ground beef is free of all bacteria and appears fresh and with a minimal amount of shrinkage, much less than would be a cooked product.

EXAMPLE V

Three ounces of fresh salmon is sealed in a laminated polyethylene pouch. A series of such pouches is moved into an air-tight vessel pressurized to 45 p.s.i.g. There, in an oven, the pouches are each subjected to 5 killowatts microwave energy for 1 minute, thermometers indicating an internal temperature of 290° F. After cooling under pressure by cold water around the package to reduce the temperature below 212° F. the pouches are removed from the vessel. Later studies show that the salmon is free of bacteria, is, in other words, sterile, while it is not overcooked.

EXAMPLE VI

Two thousand grams of peeled, sliced carrots were placed in a laminated polyethylene pouch. The package was not sealed. Before inserting the package in a pressurized chamber of FIG. 3, a small amount of steam was injected into the open package. The chamber was then pressurized to 40 p.s.i.g. The open food package was moved into a microwave tunnel and subjected to 5 KW of microwave power for 5 minutes and then subjected to cool pressurized air for 20 minutes. The temperature of the package of food was then 190° F. Then the package was heat sealed. Thirty-two days later it was found that the carrots were sterile.

EXAMPLE VII

Two hundred grams of diced potatoes were placed in a pressurized chamber. The chamber was subjected to 40 p.s.i.g. of pressure. The diced potatoes were introduced into a microwave tunnel and subjected to 5 KW of microwave power for 4 minutes and then cooled for 60 minutes while still under pressure. The cooked potatoes were then immediately placed in a glass jar which had been previously heated to 212° F. for 40 minutes. The jar was sealed. Thirty two days later the potatoes were sterile.

EXAMPLE VIII

In this example potatoes were sterilized with infra-red waves, in a pressurized tank, as illustrated in FIG. 5. The single, gas fired infra-red lamp was placed in a chamber which could be pressurized. The infra-red lamp created a heat of approximately 1,600° F. Reflectors were installed in front and in back of the infra-red lamp. Sliced potatoes were placed six inches from the infra-red lamp on a steel mesh tray. The entire chamber was pressurized to 40 p.s.i.g. The potatoes under pressure were subjected to the infra-red energy for 10 minutes and then cooled for 60 minutes. The sterilized potatoes were immediately placed in a glass jar which had been boiled for 20 minutes. Thirty two days later, the potatoes were sterile.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. Apparatus for sterilizing food and the like, including in combination:
   a pressure vessel,
   conveyor means for conveying said food into, through, and out from said pressure vessel,
   pressure-retaining means on said pressure vessel at the loci where said conveyor means enters and leaves said pressure vessel,
   an electromagnetic sterilizing tunnel contained fully within said pressure vessel and subject internally to the pressure in said pressure vessel, said tunnel having an entrance and an exit, with said conveyor means passing through said tunnel via said entrance and exit, the path therethrough being at a speed and for a length sufficient to insure sterilization of the food conveyed by said conveyor means, at a temperature higher than 100° C. and at a pressure sufficiently above atmospheric that the temperature is below the boiling point of water at that pressure, and
   cooling means in said pressure vessel beyond said tunnel for cooling the food that is passed through said tunnel below 100° C., said conveyor means passing through said cooling means after passing through said tunnel and prior to passing through the pressure retaining means at the locus where said conveyor leaves said pressure vessel.

2. The apparatus of claim 1 wherein said food enters said pressure vessel in a closed and sealed package that acts substantially as a window for the electromagnetic energy in said tunnel.

3. The apparatus of claim 1 wherein the food is conveyed into said pressure vessel in an open package and wherein there is in said pressure vessel sealing means for closing the package after it has been sterilized in said tunnel and before it is carried by said conveyor through the pressure retaining means as it leaves said pressure vessel.

4. The apparatus of claim 3 wherein said sealing means lies between said tunnel and said cooling means.

5. The apparatus of claim 1 wherein said product is conveyed by said conveyor means into said pressure vessel unpackaged and wherein there is packaging and sealing means inside said pressure vessel, to which it is brought and from which it is conveyed away by said conveyor means after said conveyor means has passed through said tunnel and before it leaves said pressure vessel through said pressure-retaining means.

6. The apparatus of claim 5 wherein said packaging and sealing means lies between said tunnel and said cooling means.

7. The apparatus of claim 1 wherein the electromagnetic energy in said tunnel is microwave energy and wherein there is a power unit for generating said microwave energy and wave guide means for conducting microwave energy to said tunnel and wherein said tunnel is provided at each end with shielding means for preventing the exit of electromagnetic energy there.

8. The apparatus of claim 7 wherein said power unit is outside said pressure vessel and wherein said wave guide is provided with an electromagnetic-energy-transparent closure means preventing egress of pressure from said pressure vessel.

9. The apparatus of claim 1 wherein said electromagnetic energy is infra-red energy and wherein said tunnel comprises a plurality of infra-red lamps, means for generating infra-red energy at said lamps, and means for conducting power for said means for generating into said pressurized tank from outside to said infra-red lamps.

10. The apparatus of claim 1 having boiler means for generating superheated steam and a conduit connecting said boiler means to said tunnel for injecting steam under pressure into said tunnel.

11. The apparatus of claim 10 wherein said boiler means is outside said pressure vessel and said conduit leads through a sealed opening into said pressure vessel.

* * * * *